(12) United States Patent
Hardy et al.

(10) Patent No.: US 11,252,564 B2
(45) Date of Patent: Feb. 15, 2022

(54) METHODS AND SYSTEMS FOR A SECURE WIRELESS NETWORK FOR INDUSTRIAL PROCESS MONITORING AND BUSINESS APPLICATIONS

(71) Applicants: PHILLIPS 66 COMPANY, Houston, TX (US); Honeywell International, Inc., Morris Plains, NJ (US)

(72) Inventors: Jason D. Hardy, Bartlesville, OK (US); Craig Michael Tally, Katy, TX (US); Shahid Bashir, Katy, TX (US); John W. Gusewelle, Dorsey, IL (US); Anthony E. Norman, Bartlesville, OK (US); Paul L. Bird, Granite City, IL (US); Clifton Tyrone Montgomery, Duluth, GA (US); Todd Frederick Bill, Buford, GA (US)

(73) Assignees: PHILLIPS 66 COMPANY, Houston, TX (US); HONEYWELL INTERNATIONAL, INC., Morris Plains, NJ (US)

( * ) Notice: Subject to any disclaimer, the term of this patent is extended or adjusted under 35 U.S.C. 154(b) by 48 days.

(21) Appl. No.: 16/849,899

(22) Filed: Apr. 15, 2020

(65) Prior Publication Data
US 2021/0329455 A1   Oct. 21, 2021

(51) Int. Cl.
*H04W 12/086* (2021.01)
*H04L 12/46* (2006.01)
*H04W 76/12* (2018.01)
*H04L 29/06* (2006.01)
*H04W 88/08* (2009.01)
*H04W 84/12* (2009.01)

(52) U.S. Cl.
CPC ....... *H04W 12/086* (2021.01); *H04L 12/4633* (2013.01); *H04L 12/4645* (2013.01); *H04L 63/029* (2013.01); *H04L 63/0478* (2013.01); *H04W 76/12* (2018.02); *H04W 84/12* (2013.01); *H04W 88/08* (2013.01)

(58) Field of Classification Search
CPC ... H04W 12/086; H04W 88/08; H04W 76/12; H04W 84/12; H04L 12/4633; H04L 12/4645; H04L 63/0478; H04L 63/029
See application file for complete search history.

(56) References Cited

U.S. PATENT DOCUMENTS

| 2014/0198670 A1* | 7/2014 | Mahasenan | H04W 24/00 370/252 |
| 2020/0274852 A1* | 8/2020 | Ahmed | H04L 63/0263 |
| 2020/0389469 A1* | 12/2020 | Litichever | H04L 63/1425 |

\* cited by examiner

*Primary Examiner* — Jung H Park
(74) *Attorney, Agent, or Firm* — Patterson + Sheridan, LLP

(57) ABSTRACT

Aspects of the present disclosure provide techniques for enabling data traffic having security of different Purdue Enterprise Reference Architecture security levels to traverse a common network. Techniques disclosed herein maintain logical separation between the different data traffic types by assigning each to a discrete virtual LAN, and discretely encrypting each data traffic type.

20 Claims, 3 Drawing Sheets

METHODS AND SYSTEMS FOR A SECURE WIRELESS NETWORK FOR INDUSTRIAL PROCESS MONITORING AND BUSINESS APPLICATIONS

BACKGROUND

Field

Embodiments of the present disclosure generally relate to transmission of secure data, and more particularly, transmission of data having different security levels on common physical and wireless networks.

Description of the Related Art

Network and data security around industrial control systems (ICS) that are an integral part of raw material processing facilities such as oil refineries, is of tantamount importance due to the nature of large scale industrial processing. The potential issues regarding system availability, reliability, process intellectual property, in addition to human safety, as well as local, regional, and in some cases, national economic security can be critical if an ICS network and/or data becomes compromised. Entities that own and operate industrial facilities follow a number of security standards in designing and maintaining ICS network and data security, such as the Purdue security architecture, among a host of other standards and government imposed regulations.

Concomitantly, entities that own and operate production facilities typically also hire work forces to operate these plants, requiring a significant information technology (IT) infrastructure to support and manage this workforce. Although data carried on IT infrastructure is important to the entity that owns and operates a processing facility, the dangers to people posed by a compromised IT infrastructure is considered far lower than that of a compromised ICS system. Accordingly, IT infrastructure is typically kept physically separate from the ICS infrastructure. For example, IT infrastructure data typically travels on separate cables, and is transmitted across separate wireless networks, from ICS data.

However, because ICS systems are implemented and maintained separately from IT infrastructure, inherent inefficiencies arise as production facilities scale up to grow in size and complexity. At least two distinct technology infrastructures are typically purchased, installed and maintained, at significant cost. In addition, it is not uncommon for an IT infrastructure to technically hinder an ICS infrastructure, and vice versa.

For example, IT wireless infrastructure can be installed to collect analytics data for long term performance improvement as well as for scheduling and other operations and maintenance support applications. At the same time, ICS wireless infrastructure can be installed to collect data from battery-powered wireless instruments. However, high power IT access points can cause battery-powered ICS sensors to increase their output power, causing significantly reduced instrument battery life.

Moreover, because the IT and ICS systems are separate with separate technologies infrastructure, each may require their own support staff. Also, because each system may affect the other, troubleshooting problems on one system typically requires coordination between the IT and ICS support teams, increasing complexity in support operations. Regarding network and data security, the typical separate implementations of IT and ICS systems result in separate network monitoring for each system, in addition to a need for separate security infrastructure and personnel.

In response, to at least mitigate the effects of these separate systems on the other, some companies have implemented their IT infrastructure within a processing facility using cellular technology, while the ICS infrastructure is implemented with Ethernet-based networking technologies (e.g., IEEE 802.11 or 802.15.4). Some companies have implemented their IT infrastructure using Ethernet-based networking that has been heavily configured to mitigate the above effects, in addition to requiring regular reviews to ensure channels do not overlap. However, these solutions still suffer from maintaining two distinct networks that rely on different technologies, or differently configured versions of the same technology, each requiring their own support staff and related infrastructure.

What is needed are systems and methods to enable ICS and IT infrastructure to utilize the same networking and data transport technologies, while maintaining the appropriate levels of security for each.

SUMMARY

Certain embodiments disclosed herein provide a system for securely transferring data. The system generally includes a first firewall configured at a third security level, a second firewall configured at the third security level, and a first wireless access point (WAP) configured to receive first data traffic from a first device, encrypt the first data traffic at the third security level, and tag the first data traffic as part of the first vLAN.

The system further includes a second WAP configured to receive a second data traffic from a second device that transmits data encrypted at the third security level, further encrypt the second data traffic at the third security level, and tag the second data traffic as part of the second vLAN, and a physical transport media coupled to the first wireless access point and second wireless access point, receiving first data traffic from the first WAP and second data traffic from the second WAP.

The system further includes a root access point (RAP) configured to receive the first data traffic and second data traffic from the physical transport media, and configured to maintain logical separation between the first data traffic and second data traffic based on the first vLAN and second vLAN tags, the RAP configured to encapsulate the second data traffic, and wirelessly transmitting first data traffic and the encapsulated and further encrypted second data traffic.

In other embodiments, the system further includes a switch comprising a wireless receiver configured to wirelessly receive the transmitted first and second data traffic from the RAP, remove the encapsulation from the second data traffic, route the first data traffic to the first firewall based on the first vLAN tag, and route the second data traffic to the second firewall based on the second vLAN tag.

Certain embodiments disclosed herein provide a method for securely transferring data. Disclosed embodiments providing a first firewall configured at a third security level, providing a second firewall configured at a third security level, the second firewall comprising a wireless device manager, and providing a first wireless access point (WAP) configured to receive encrypted first data traffic from a first device, and tag the first data traffic with a first vLAN tag. The method further includes providing a second WAP configured to receive encrypted second data traffic from a second device that transmits data encrypted at the third security level, and tag the second data traffic with a second vLAN tag, providing a wireless transport coupled to the first wireless access point and second wireless access point, configured to receive the first data traffic from the first WAP and second data traffic from the second WAP. The method further includes providing a root access point (RAP) configured to wirelessly receive the first data traffic and second data traffic from the wireless transport, and configured to maintain logical separation between the first data traffic and second data traffic based on the first and second vLAN tags, and providing a switch configured to receive the transmitted first and second data traffic from the RAP, route the first data traffic to the first firewall based on the first vLAN tag, and route the second data traffic to the second firewall based on the second vLAN tag.

Certain embodiments disclosed herein provide a non-transitory computer readable medium comprising computer readable instructions for securely transferring data, the method including providing a first firewall configured at a third security level, providing a second firewall configured at a third security level, the second firewall comprising a wireless device manager, and providing a first wireless access point (WAP) configured to receive encrypted first data traffic from a first device, and tag the first data traffic with a first vLAN tag. The method further includes providing a second WAP configured to receive encrypted second data traffic from a second device that transmits data encrypted at the third security level, and tag the second data traffic with a second vLAN tag, providing a wireless transport coupled to the first wireless access point and second wireless access point, configured to receive the first data traffic from the first WAP and second data traffic from the second WAP. The method further includes providing a root access point (RAP) configured to wirelessly receive the first data traffic and second data traffic from the wireless transport, and configured to maintain logical separation between the first data traffic and second data traffic based on the first and second vLAN tags, and providing a switch configured to receive the transmitted first and second data traffic from the RAP, route the first data traffic to the first firewall based on the first vLAN tag, and route the second data traffic to the second firewall based on the second vLAN tag.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
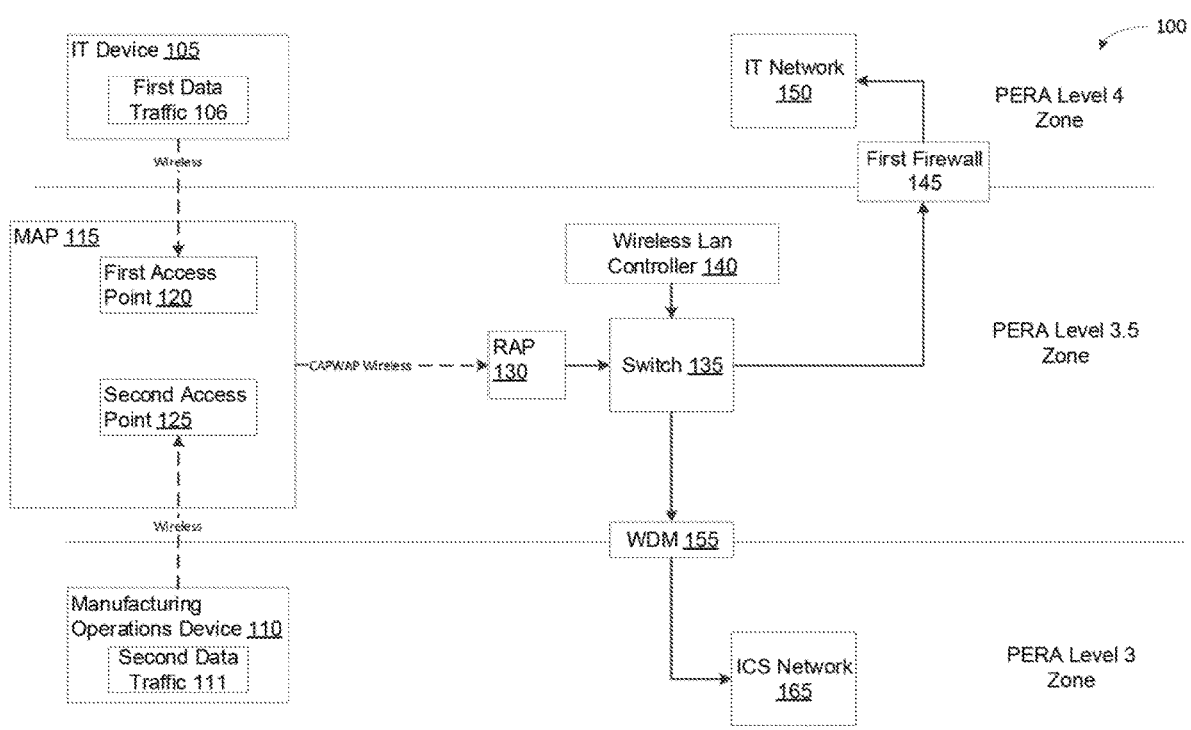
FIG. 1 depicts a system for a secure network for combined security level data, according to disclosed embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Modern ICS data networks are governed by a variety of standards, one of the more prominent metrics of data security in this context being the Purdue Enterprise Reference Architecture (PERA) reference model. This model was developed by the Industry-Purdue University Consortium for Computer Integrated Manufacturing, for the purpose of laying out a security model for enterprise computer and data control, for a manufacturing organization.

The architecture of the basic PERA model is comprised of five levels, level 0 through level 4. Levels 0, 1, and 2 describe real-time physical processes and the systems that control them. For example, in an oil refinery, a level 0 system would be an actual physical process such as crude oil distillation, to distill incoming crude oil into various fractional components. Level 1 systems include devices that react in real time to process conditions. A Level 2 system would include systems that directly control the distillation process, such as turning valves, raising/lowering temperatures, operation of distillation equipment, and the like. A Level 3 system would include manufacturing operations system, for example, sensors that monitor and provide data about the distillation to another system that controls the distillation (i.e., a Level 2 process), but does not participate in controlling the process. Finally, a Level 4 system includes IT infrastructure systems, such as business logistics systems (e.g., ERP systems that establish basic plant production schedules, material use, shipping, and inventory), personnel systems, personnel communications (e.g., e-mail), accounting, finance, R&D (i.e., to the extent the R&D is not engaged in performing physical production processes).

At each level of the PERA, a different level of security is required based upon safety and security requirements of the operation. For example, Levels 0, 1, and 2 require the highest level of security as compromised computer systems (including computer networks) performing Level 0,1, and 2 operations could result in serious injury and/or local, regional, or even national economic harm. For example, in some versions of PERA Levels 0, 1, and 2, these systems may not utilize wireless communications (in addition to a host of other requirements) to minimize the 'attack surface' of these systems. Level 3 systems, in some embodiments, may utilize wireless information, but it must be strongly encrypted 'end to end' and be monitored with computer systems specifically designed to prevent compromise of this data. Security standards for Level 4 systems, although they do carry information critical to an enterprise, are typically set by the owning entity, although in some instances are governed at least in part by governmental regulation (e.g., encryption and reporting requirements for money transfer, data use and privacy requirements for tax preparation data, privacy requirements for personally identifiable information ("PII")), but are generally speaking, less stringent than the PERA levels below it.

In order for a device or data item to be "configured" or "appropriate" for a particular PERA security level, this means that, in addition to complying with other requirements of a particular PERA security requirement, credentials (e.g., access keys) needed for a device or data item exist in, or pass from one zone to another (e.g., one physical location to another, or for data, crossing a boundary from one logical region or physical device to another, or traversing a logical or physical boundary, such as crossing a network firewall, passing through a switch, entering an access point, etc.). Hardware, software, and/or firmware components are present in network components to ensure the existence of the appropriate credentials within the device or within the data item in question.

To maintain integrity of data or a system according to the PERA model, the security of the data or system must comply with the security requirements of its level, end to end. If a system, or data is exposed to conditions that are of a less secure PERA level, that system or data is considered to be compromised, and at best is 'demoted' to the PERA level of the condition to which it was exposed. For example, should Level 3 sensor data become completely unencrypted (or not encrypted to the appropriate Level 3 standard) during transmission over one or more networks, it would be considered compromised, untrustworthy, and not useable by another PERA Level 3 system.

In previous approaches, Level 3 (e.g., sensor) data and Level 4 (e.g., business management) data were transported on different physical networks, requiring companies to plan, implement, and maintain each set of networks. Typically, because different skill sets are required to maintain a PERA Level 3 network versus a Level 4 network, additional staffing was required to maintain both sets of infrastructure.

In the methods and systems described below, the inventors have discovered how to combine PERA Level 3 and Level 4 data traffic on the same physical and wireless networks, in a way that maintains the security integrity of each set of data traffic.

In some embodiments, Level 4 data traffic is encrypted to a Level 3 standard, while Level 3 data traffic security is maintained, and the encryption for each data traffic stream is maintained until each traffic type reaches its respective destination. So, for example, once the Level 3 encrypted Level 4 data traffic reaches its Level 4 destination, it is decrypted to a state appropriate for the Level 4 system. In transit, potentially across multiple network types (i.e., wired vs wireless) each type of data traffic is maintained logically separated from the other, by tagging each data packed of each stream as operating on a virtual local area network (vLAN) for that particular data traffic stream, in addition to maintaining data separation via encryption. So, for example, the Level 4 data traffic would be tagged as operating on a first vLAN, while the Level 3 data traffic is tagged as operating on a second vLAN. By tagging each data stream as being part of a different vLAN, and encrypting each stream separately, hardware network components that handle these data streams may be configured with rules that prevent co-mingling of the data streams.

As a result, both the Level 4 and Level 3 data traffic may be carried on a common network infrastructure. At an access point level, because the Level 4 and Level 3 data are picked up by access points controlled by a common network infrastructure, communication collisions may be avoided, saving battery life of devices and enabling high data throughput in data-intense environments. Because both types of data traffic can live on a common network, only one set of networking equipment needs to be purchased, and one team can be assigned responsibility for maintaining and monitoring the network environment. This in turn results in significant cost savings in terms of headcount, but greater responsiveness to outages/issues, and only one network to monitor from a security perspective.

FIG. 1 depicts a system 100 for a secure network for combined security level data, according to disclosed embodiments. System 100 comprises an IT device 105, that may be any device appropriate for a PERA Level 4 network. Such devices include, but are not limited to ID badges, portable computing devices, security cameras, and other devices appropriate for PERA Level 4 security. IT device 105 generates first data traffic 106, that at least initially (i.e., when wirelessly transmitted from the IT device 105) may not be encrypted, not encrypted to a PERA level standard below Level 4, or lacks credentials for a PERA level standard below Level 4. The system 100 further comprises manufacturing operations device 110, a compute device such as a sensor that monitors plant operations and conditions (e.g., temperature, vibration), configured with security credentials (e.g., access keys) appropriate to the PERA Level 3 security standard. In some embodiments, these credentials are synchronized to security credentials provided by a wireless device manager (WDM) 155 that assigns keys network elements of the system 100.

Manufacturing operations device 110 encrypts second data traffic 111 and transmits second data traffic 111 with the PERA level 3 security credentials. In some embodiments, data resident within manufacturing operations device 110 is encrypted at rest that has been encrypted with a rotating key, and any data transmitted wirelessly out of the device is encrypted to at least a PERA Level 3 standard.

System 100 further comprises a mesh access point (MAP) 115, a mesh-based collection of access points comprising a plurality of wireless access points, accessible to the IT device 105 and the manufacturing operations device 110. By utilizing access points on the same mesh, wireless spectrum congestion seen in prior approaches that duplicate networks is avoided. A first access point 120 is and a second access point 125, in some embodiments, are wireless access points configured to receive data traffic from one or both of IT device 105 and manufacturing operations device 110. Both access points receive credentials from the WDM 155 so as to authenticate data as belonging to an ICS network 165, or in this case, an IT network 150. When first data traffic 106 is received by either access point, the first data traffic 106 is recognized as being of the IT network 150, and tagged as part of a first vLAN by a wireless LAN controller 140. Concomitantly, when the second data traffic 111 is received by one of the first access point 120 and second access point 125, the credentials assigned to the second data traffic 111 by the manufacturing operations device 110 are matched to the credentials provided by the WDM 155, and the second data traffic 111 is flagged by the wireless LAN controller 140 as being part of a second vLAN, with a destination being the ICS network 165. The wireless LAN controller 140 further serves to encrypt and encapsulate the second data traffic 111 with a Control and Provisioning of Wireless Access Points Protocol (CAPWAP) function, such as provided by Cisco Systems. The CAPWAP function serves to encapsulate and encrypt data provided to it, further enabling logical separation between the first and second data traffic. It should be understood that any access point, such as first access point 120 and second access point 125, can receive data from either of, or both of, IT device 105 and manufacturing operations device 110.

When data from a higher (i.e., less secure) PERA level and a lower (i.e., more secure) PERA level, such as from a PERA level 4 to a PERA level 3, one of skill in the art will recognize that this is considered to be a "hybrid" PERA level 3.5, sometimes considered a 'de-militarized' zone (DMZ) of a network in which is capable of receiving, transmitting, and acting on data of multiple security levels from different security zones, while maintaining the appropriate security level of data within the DMZ.

MAP 115 transmits the first data traffic 106 and second data traffic 111, via a common wireless connection to a root access point (RAP) 130 of the system 100. While the first and second data traffic are within the MAP 115 and RAP 130, these network elements maintain logical separation between these data traffic types, by a rules configuration, programmatic routine, or other method that may take the first VLAN tag and second VLAN tag as input and in response marking it as part of a second VLAN, according to embodiments disclosed herein, to maintain the logical separation between the first data traffic 106 and second data traffic 111. Additionally, the first and second data traffic are separately encrypted with different credentials (and possibly encryption types), and the second data traffic 111 is further encapsulated by the CAPWAP function of the wireless LAN controller 140.

RAP 130 provides the first data traffic 106 and second data traffic 111 to a switch 135.

Switch 135 is coupled to the wireless LAN controller 140, which operates to manage vLANs resident in the system 100 and CAPWAP encapsulation. Upon reaching switch 135, wireless LAN controller 140 removes CAPWAP encapsulation from the second data traffic 111. While continuing to maintain logical separation of the first data traffic 106 and second data traffic 111 based on the respective vLAN tags, and encrypted states, of these data elements, switch 135 directs the first data traffic 106 to a first firewall 145 based on the first VLAN tag. At the first firewall 145, first data traffic 106 is inspected for PERA Level 4 credentials before passing to an IT network 150, configured at PERA Level 4.

Switch 135 directs the second data traffic 111 to the wireless device manager (WDM) 155 that inspects the data traffic 111 for the appropriate credentials related to the manufacturing operations device 110. WDM 155 then directs the second data traffic 111 to an ICS network 165, configured at PERA Level 3 security level.

Figure 2:
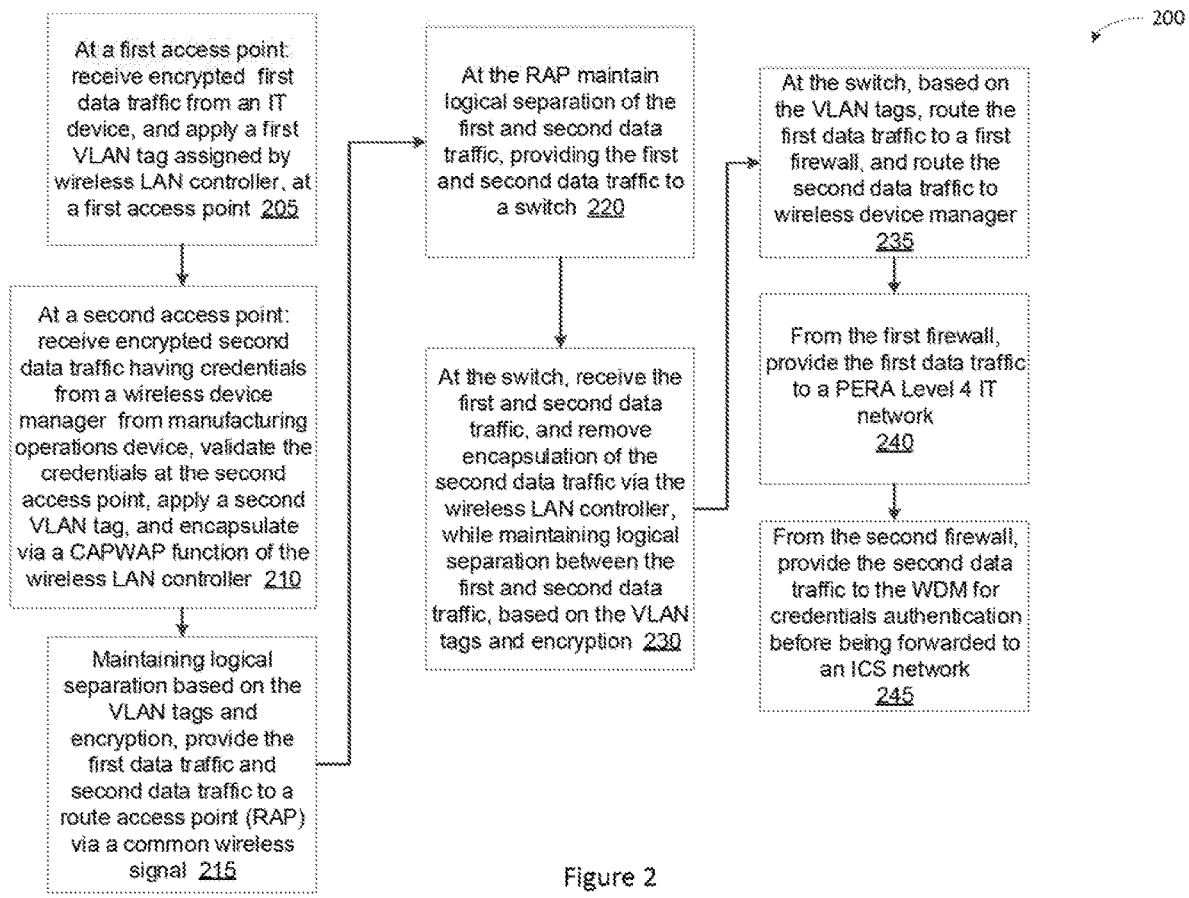
FIG. 2 depicts a method for a secure method for combined security level data, according to disclosed embodiments.

FIG. 2 depicts a method 200 for a secure method for combined security level data, according to at least one embodiment.

At 205, the method 200 provides that the first access point 120 receives first data traffic 106 from IT device 105. First data traffic may be unencrypted, or encrypted at a PERA Level 4 encryption. Once the first access point 120 receives the first data traffic 106, it will encrypt this data to at least a PERA Level 3 encryption, in addition to applying the first vLAN tag to this data, supplied by a wireless LAN controller, marking the first data traffic 106 as being part of a first vLAN.

At 210, the second access point 125 receives second data traffic 111 from the manufacturing operations device 110. The manufacturing operations device 110 has been assigned credentials by wireless device manager 155 which are provided to the second data traffic and authenticated at the second access point 125 based on credentials received by the second access point 125 from the WDM 155. Second data traffic 111 is encrypted at the manufacturing operations device 110 prior to transmission to the second access point, at a PERA Level 3 encryption. The second access point 125 further encrypts and encapsulates the second data traffic 111 via a CAPWAP function of the wireless LAN controller 140 with PERA Level 3 encryption, in addition to applying the second vLAN tag to this data element, marking second data traffic 111 as being part of a second vLAN.

At 215, while maintaining logical separation between the first data traffic 106 and second data traffic 111 based on the VLAN tags and encryption the first and second data traffic are wirelessly transmitted to the RAP 130.

At 220, the method 200 maintains logical separation between the first data traffic 106 and second data traffic 111 at the RAP 130. The RAP 130 provides the first and second data traffic to a switch 135, coupled to the wireless LAN controller 140 and WDM 155.

At 230, the method 200 receives the first data traffic 106 and second data traffic 111 at the switch 135. The switch 135 maintains logical separation of these data elements based on the vLAN tags and encryption of each. The switch 135 provides the second data traffic 111 to the WLC 140 that removes the encapsulation and encryption that was applied by the RAP 130.

At 235, the method 200 employs the switch 135 to route the first data traffic to a first firewall 145, and the second data traffic to the WDM 155, based on VLAN tags, and in the case of the second data traffic, credentials received from the manufacturing operations device 110. In some embodiments, the wireless LAN controller 140 governs the routing of these data elements to their respective destinations.

At 240, PERA Level 3 credentials of the first data traffic 106 are applied to the first firewall 145. Upon proper PERA Level 3 authentication at the first firewall 145, first data traffic is decrypted to its original state, prior to having PERA Level 3 encryption applied at the first access point 120. This data element is then forwarded by the first firewall 145 to a PERA Level 4 IT network 150.

At 245, PERA Level 3 credentials of the second data traffic 111 are authenticated by the WDM 155. Upon proper PERA Level 3 authentication at the WDM 155, the second data traffic 111 is forwarded to a PERA Level 3 ICS network 165.

Some type of conclusion or wrap up of the method? Upon reaching their respective networks, the first data traffic 106 and second data traffic may be utilized by their respective networks. In the case of the first data traffic 106 being provided to the PERA level 4 IT network, there may be systems utilized by an entity for organizational management and finance, such as accounting, finance, personnel management, project management, or other operations utilized for functioning of a business or other organizational entity. In the case of the second data traffic 111 being provided to the PERA level 3 ICS network, in some embodiments this comprises sensor data for monitoring ICS processes and equipment, such as oil or mineral refining.

Figure 3:
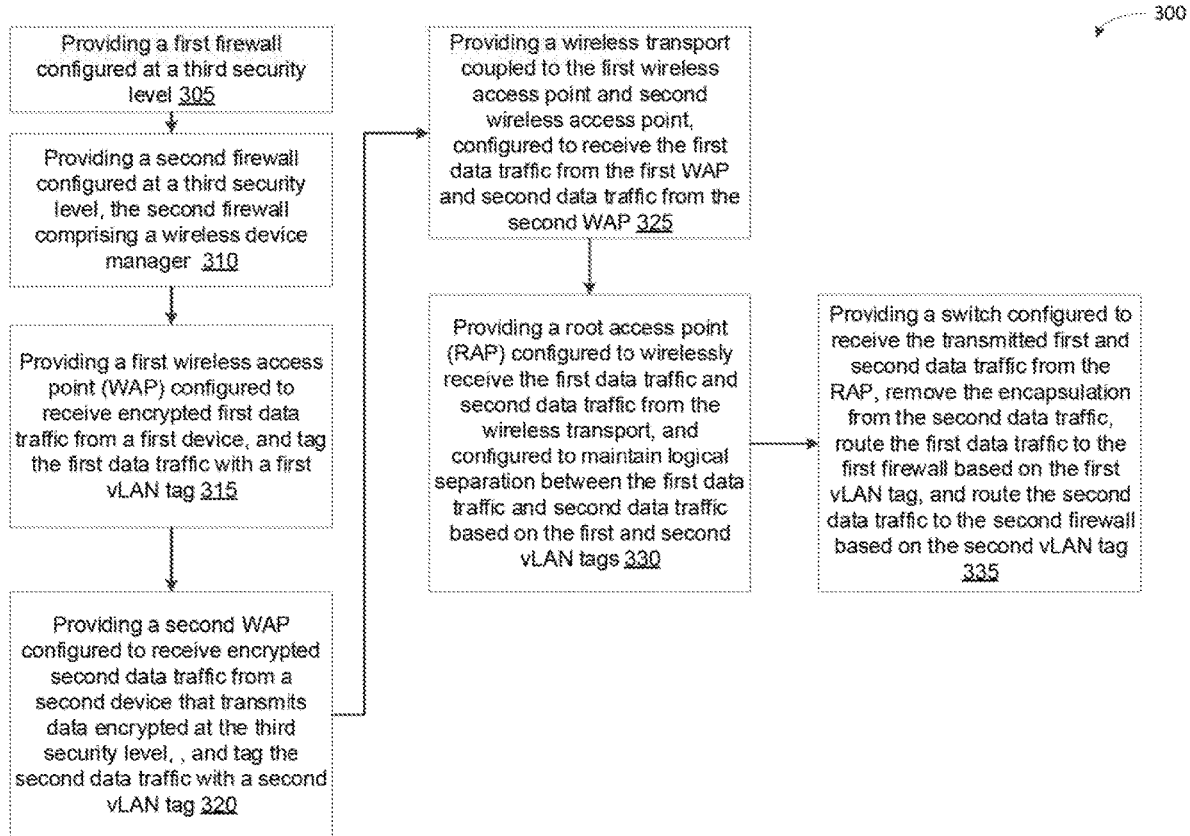
FIG. 3 depicts an alternate method for a secure method for combined security level data, according to disclosed embodiments.

FIG. 3 depicts another embodiment of a secure method for combining security level data, according to disclosed embodiments.

At 305, the method 300 provides a first firewall configured at a third security level. In embodiments, the third security level corresponds to a PERA level 3 security architecture. At 310, the method provides a second firewall configured at the third security level.

At 315, the method 300 provides a first wireless access point (WAP) configured to receive encrypted first data traffic from a first device, and tag the first data traffic with a first vLAN tag. In some embodiments, the first data traffic at the first device is encrypted at a fourth security level.

At 320, the method 300 provides a second WAP configured to receive encrypted second data traffic from a second device that transmits data encrypted at the third security level and tag the second data traffic with a second vLAN tag. In some embodiments, second WAP is further configured to encapsulate the second data traffic via a CAPWAP function.

At 325, the method 300 provides a wireless transport coupled to the first wireless access point and second wireless access point, configured to receive the first data traffic from the first WAP and second data traffic from the second WAP.

At 330, the method 300 provides a root access point (RAP) configured to wirelessly receive the first data traffic and second data traffic from the wireless transport, and configured to maintain logical separation between the first data traffic and second data traffic based on the first and second vLAN tags.

At 335, the method 300 provides a switch configured to receive the transmitted first and second data traffic from the RAP, remove the encapsulation from the second data traffic, route the first data traffic to the first firewall based on the first vLAN tag, and route the second data traffic to the second firewall based on the second vLAN tag. In some embodiments, the switch may be configured to remove the encapsulation from the second data traffic via the CAPWAP function.

In some embodiments, the method 300 further comprises providing a wireless LAN controller configured to maintain the separation of the first data traffic and second data traffic based on the first vLAN tag and second vLAN tag.

The inventors' discovery of the system and method to transport mixed security level data traffic on a single network infrastructure may result in significant savings in time and personnel, by providing a single network architecture for purposes of security monitoring, troubleshooting, and maintaining.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While the foregoing is directed to embodiments of the present disclosure, other and further embodiments of the disclosure may be devised without departing from the basic scope thereof, and the scope thereof is determined by the claims that follow.

What is claimed is:

1. A system for securely transferring data, the system comprising:
 a first firewall configured at a third security level;
 a second firewall configured at the third security level, the second firewall comprising a wireless device manager;
 a first wireless access point (WAP) configured to receive first data traffic from a first device, encrypt the first data traffic at the third security level, and tag the first data traffic with a first vLAN tag;
 a second WAP configured to receive a second data traffic from a second device that transmits data encrypted at the third security level, further encrypt the second data traffic at the third security level, and tag the second data traffic with a second vLAN tag;
 a common wireless transport coupled to the first wireless access point and second wireless access point, receiving received first data traffic from the first WAP and second data traffic from the second WAP;
 a root access point (RAP) configured to wirelessly receive the first data traffic and second data traffic from the common wireless transport, and configured to maintain logical separation between the first data traffic and second data traffic based on the first and second vLAN tags; and
 a switch configured to:
  receive the transmitted first and second data traffic from the RAP;
  remove the encapsulation from the second data traffic;

route the first data traffic to the first firewall based on the first vLAN tag; and
route the second data traffic to the second firewall based on the second vLAN tag.

2. The system of claim 1 wherein the second WAP is configured to encapsulate the second data traffic via a CAPWAP function.

3. The system of claim 2 wherein the switch is configured to remove the encapsulation from the second data traffic via the CAPWAP function.

4. The system of claim 3 further comprising a wireless LAN controller configured to maintain the separation of the first data traffic and second data traffic based on the first VLAN tag and second VLAN tag.

5. The system of claim 4 wherein the first data traffic at the first device is encrypted at a fourth security level.

6. The system of claim 5 wherein the third security level is a Purdue Enterprise Reference Architecture Level 3 security, and the fourth security level is a Purdue Enterprise Reference Architecture Level.

7. A method for securely transferring data, the method comprising:
providing a first firewall configured at a third security level;
providing a second firewall configured at a third security level, the second firewall comprising a wireless device manager;
providing a first wireless access point (WAP) configured to receive encrypted first data traffic from a first device, and tag the first data traffic with a first vLAN tag;
providing a second WAP configured to receive encrypted second data traffic from a second device that transmits data encrypted at the third security level, and tag the second data traffic with a second vLAN tag;
providing a wireless transport coupled to the first wireless access point and second wireless access point, configured to receive the first data traffic from the first WAP and second data traffic from the second WAP;
providing a root access point (RAP) configured to wirelessly receive the first data traffic and second data traffic from the wireless transport, and configured to maintain logical separation between the first data traffic and second data traffic based on the first and second vLAN tags; and
providing a switch configured to:
receive the transmitted first and second data traffic from the RAP;
route the first data traffic to the first firewall based on the first vLAN tag; and
route the second data traffic to the second firewall based on the second vLAN tag.

8. The method of claim 7 wherein the second WAP is further configured to configured to encapsulate the second data traffic via a CAPWAP function.

9. The method of claim 8 wherein the switch is further configured to remove the encapsulation from the second data traffic via the CAPWAP function.

10. The method of claim 9 further comprising providing a wireless LAN controller configured to maintain the separation of the first data traffic and second data traffic based on the first vLAN tag and second vLAN tag.

11. The method of claim 7 wherein the first data traffic is decrypted to a fourth security level at the first firewall.

12. The method of claim 10 wherein the first data traffic at the first device is encrypted at a fourth security level.

13. The method of claim 12 wherein the third security level is a Purdue Enterprise Reference Architecture Level 3 security, and the fourth security level is a Purdue Enterprise Reference Architecture Level 4 security.

14. A non-transitory computer readable medium comprising computer readable instructions comprising a method for securely transferring data, the method comprising:
providing a first firewall configured at a third security level;
providing a second firewall configured at a third security level, the second firewall comprising a wireless device manager;
providing a first wireless access point (WAP) configured to receive encrypted first data traffic from a first device, and tag the first data traffic with a first vLAN tag;
providing a second WAP configured to receive encrypted second data traffic from a second device that transmits data encrypted at the third security level, and tag the second data traffic with a second vLAN tag;
providing a wireless transport coupled to the first wireless access point and second wireless access point, configured to receive the first data traffic from the first WAP and second data traffic from the second WAP;
providing a root access point (RAP) configured to wirelessly receive the first data traffic and second data traffic from the wireless transport, and configured to maintain logical separation between the first data traffic and second data traffic based on the first and second vLAN tags; and
providing a switch configured to:
receive the transmitted first and second data traffic from the RAP;
route the first data traffic to the first firewall based on the first vLAN tag; and
route the second data traffic to the second firewall based on the second vLAN tag.

15. The non-transitory computer-readable medium of claim 14 wherein the second WAP is further configured to encapsulate the second data traffic via a CAPWAP function.

16. The non-transitory computer-readable medium of claim 15 wherein the switch is further configured to remove the encapsulation from the second data traffic via the CAPWAP function.

17. The non-transitory computer-readable medium of claim 15 further comprising providing a wireless LAN controller configured to maintain the separation of the first data traffic and second data traffic based on the first vLAN tag and second vLAN tag.

18. The non-transitory computer-readable medium of claim 14 wherein the first data traffic is decrypted to a fourth security level at the first firewall.

19. The non-transitory computer-readable medium of claim 17 wherein the first data traffic at the first device is encrypted at a fourth security level.

20. The non-transitory computer-readable medium of claim 19 wherein the third security level is a Purdue Enterprise Reference Architecture Level 3 security, and the fourth security level is a Purdue Enterprise Reference Architecture Level 4 security.

* * * * *